Nov. 28, 1933.    M. L. YOUNG    1,937,260
ANIMAL TRAP
Filed Nov. 8, 1932
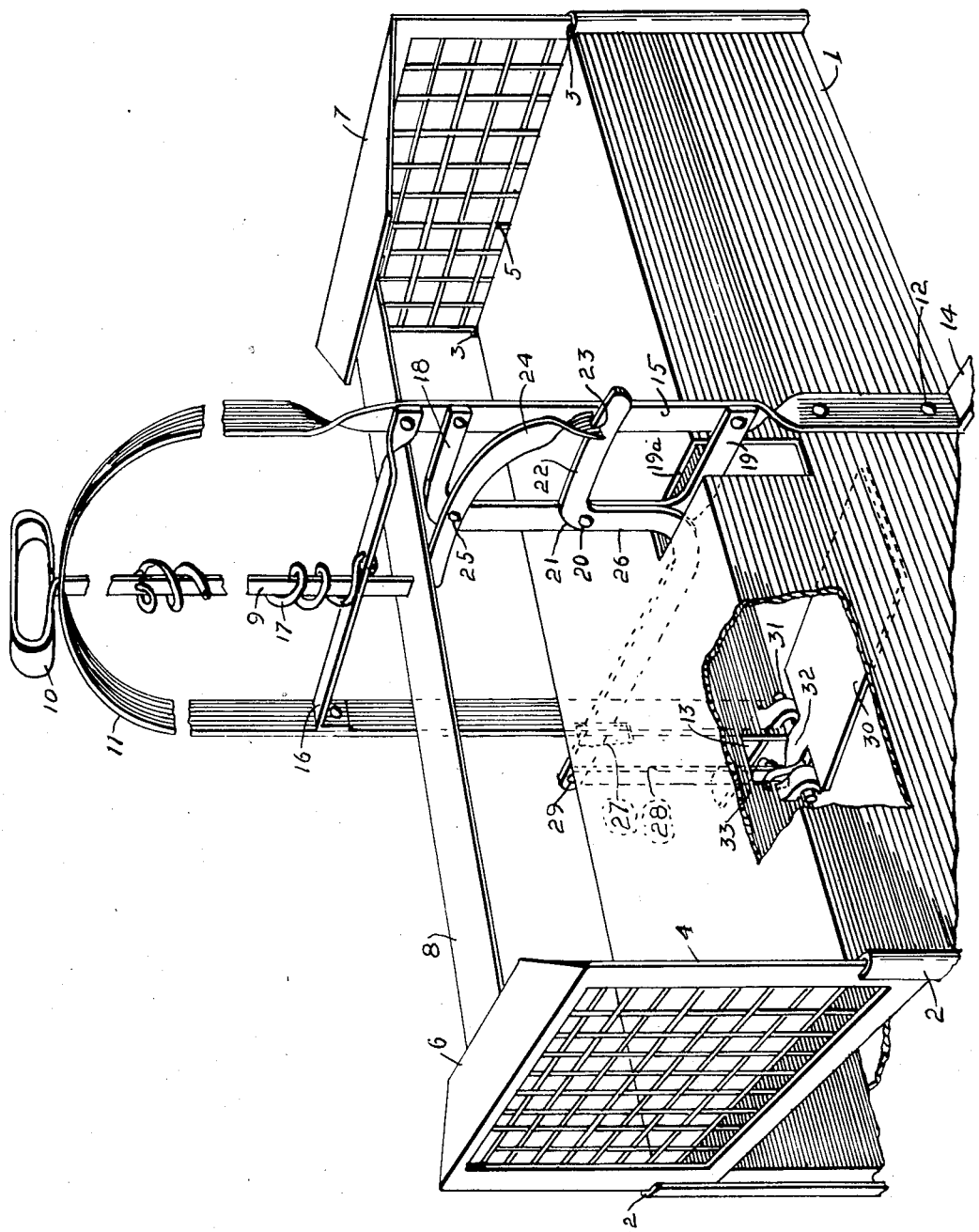
INVENTOR
Mark L. Young
John A. Naismith
ATTORNEY

Patented Nov. 28, 1933

1,937,260

UNITED STATES PATENT OFFICE 1,937,260

ANIMAL TRAP

Mark L. Young, Sunnyvale, Calif.

Application November 8, 1932. Serial No. 641,713

1 Claim. (Cl. 43—61)

The present invention relates particularly to a trap for catching rats.

It is one object of the present invention to provide a trap of the character indicated that will effectually emprison a rodent without bodily injury thereto.

It is another object of the invention to provide a trap of the character indicated that can be economically manufactured in any desired form or size, simple in construction, positive in action, strong, durable, and highly efficient in its practical application.

The drawing is a perspective illustration of a trap embodying my invention, parts broken away.

In the particular embodiment of the invention herein shown, the reference character 1 indicates an open ended box-like structure sufficiently large to permit a rodent to make its way therethrough and approximately twice the length of the length of the largest rodent that may be caught.

Each end of the box is fitted with vertical guides at its side edges as shown at 2 and 3, the guides 2 receiving a vertically sliding door 4, and the guides 3 receiving a vertically sliding door 5.

The two doors 4 and 5 are provided with opposed and inwardly extending top flanges as 6 and 7, and these flanges are connected by a bar 8 overlying the center of the top of the box and functioning as a means whereby the two doors may be raised or dropped as a unit. In the center of the bar 8 is an upstanding bar 9 fitted with a handle 10.

At 11 is a piece of strap-iron bent into the form of an inverted U and disposed over the box 1 crosswise thereof so that the bar 9 may pass through the center of its top. The bottom end portions of this member are secured to the sides of box 1 as at 12, and their extreme ends are bent outwardly as at 13—14 to form treads for the purpose hereafter more particularly set forth. The central portion of one side of member 11 is twisted to lie in a plane at right angles to the longitudinal axis of the box, as indicated at 15.

A bar 16 is fixedly mounted on bar 11 and is horizontally disposed above the highest level to which the end doors may be raised, the upstanding bar 9 passing therethrough. At 17 is shown a coil spring connected to bar 16 and to bar 9 and encircling the latter. Obviously, when the doors 4 and 5 are raised by pulling upwardly on handle 10 the spring is placed under tension and will immediately return the doors to their closed positions when released.

At 18 is shown a bracket mounted on portion 15 of bar 11 and having its lower arm 19 passing through a slot 19a formed in the corner of box 1. At 20 on bracket 18 is pivotally mounted a lever 21 having its short arm 22 extending outwardly to bar 11 and having a notch 23 formed in its upper edge. This notch is engaged by a trigger 24 pivoted on bracket 18 at 25 and adapted to engage the under side of bar 8 and support the same when the latter is raised and the trigger 24 in engagement with notch 23.

The long arm of the lever 21 passes downwardly at right angles to arm 22 as shown at 26, entering the box through slot 19a and then passing crosswise of the box and out through an opening 27 in the opposite side of the box. To the projecting end of the lever is connected a link 28 as at 29.

At 30 is shown a tread pivotally mounted at 31 and disposed to overlie the floor of the box at about the center thereof. The pivoted end of the tread is provided with a projection 32 which is pivotally connected to the lower end of link 28 at 33.

In setting the trap the operator places his feet on treads 13—14 to hold the box solidly on the ground, then grasping the handle 10 he raises the gates as above described and engages the trigger in notch 23, and then places the trap in a region where rats are known to be.

A rat will discover and pass through a covered passageway without special attraction in the form of bait. Upon discovering the trap above described and seeing it open at both ends, the rat will enter at one end and start through. When it reaches the center of the box it is forced to walk over the tread 30 and thereby operates the lever 21 to release the trigger 24. Upon release of the trigger the tensioned spring 17 instantly pulls both end doors shut and effectually imprisons the rat.

It is to be understood, of course, that while I have herein shown and described but one specific embodiment of the invention, changes in form, construction, and method of assembly and operation may be made within the scope of the appended claim.

I claim:

An animal trap comprising an open ended box structure, a vertically slidable closure mounted on each end thereof, a bar connecting said closures, an upstanding element mounted on the central portion of the box, a handle mounted on the bar, resilient means inserted between the handle and upstanding element to urge the closures into closed positions, a lever having pivotal connection with the upstanding element on one side of the box and extending transversely through and to the other side of the box, a trip lever having pivotal connection with the upstanding element and having separable engagement with the adjacent arm of the first mentioned lever and with the closure connecting bar when raised, a tread pivotally mounted on the box to overlie the floor thereof, and a link pivotally connecting the tread and the adjacent end of the first mentioned lever.

MARK L. YOUNG.